(12) United States Patent
Liao et al.

(10) Patent No.: US 12,552,130 B2
(45) Date of Patent: Feb. 17, 2026

(54) TRANSPARENT SOLDER MASK PROTECTION FILM, METHOD FOR PRODUCING THE SAME, AND METHOD FOR USING THE SAME

(71) Applicant: NAN YA PLASTICS CORPORATION, Taipei (TW)

(72) Inventors: Te-Chao Liao, Taipei (TW); Chun-Che Tsao, Taipei (TW); Cheng-Hung Chen, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 147 days.

(21) Appl. No.: 18/243,151

(22) Filed: Sep. 7, 2023

(65) Prior Publication Data

US 2025/0010570 A1   Jan. 9, 2025

(30) Foreign Application Priority Data

Jul. 7, 2023   (TW) .................. 112125433

(51) Int. Cl.
*B32B 3/30*       (2006.01)
*B32B 7/06*       (2019.01)
(Continued)

(52) U.S. Cl.
CPC .................. *B32B 3/30* (2013.01); *B32B 7/06* (2013.01); *B32B 7/12* (2013.01); *B32B 27/08* (2013.01);
(Continued)

(58) Field of Classification Search
CPC .... B32B 3/30; B32B 7/06; B32B 7/12; B32B 27/08; B32B 27/36; B32B 37/24;
(Continued)

(56) References Cited

U.S. PATENT DOCUMENTS 3,301,741 A * 1/1967 Danielson .................. C09J 7/21
                                                      156/247
3,554,835 A * 1/1971 Morgan .................... C09J 7/38
                                                      156/289
(Continued)

FOREIGN PATENT DOCUMENTS

CN      113999625 A    2/2022
JP      2002169319 A   6/2002
(Continued)

OTHER PUBLICATIONS

Machine translation of JP-2022550806-A. (Year: 2022).*

*Primary Examiner* — Patricia L. Nordmeyer
(74) *Attorney, Agent, or Firm* — Li & Cai Intellectual Property (USA) Office

(57) ABSTRACT

A transparent solder mask protection film, a method for producing the same, and a method for using the same are provided. The transparent solder mask protection film includes a first film layer, a second film layer, and a release film material. The first film layer is a polyester base film layer. The second film layer is formed on a surface of the first film layer. The second film layer is a pressure sensitive adhesive film layer. The release film material includes a release base film and a release coating layer disposed between the release base film and the second film layer. The release base film is a polyester release film. The release coating layer includes a silicone resin material and inorganic particles. After the release film material is separated from the second film layer, a surface of the second film layer is formed into a concave-convex microstructure.

5 Claims, 4 Drawing Sheets

(51) Int. Cl.
 *B32B 7/12* (2006.01)
 *B32B 27/08* (2006.01)
 *B32B 27/36* (2006.01)
 *B32B 37/24* (2006.01)

(52) U.S. Cl.
 CPC .............. *B32B 27/36* (2013.01); *B32B 37/24* (2013.01); *B32B 2037/243* (2013.01); *B32B 2255/10* (2013.01); *B32B 2255/26* (2013.01); *B32B 2264/10* (2013.01); *B32B 2264/302* (2020.08); *B32B 2307/412* (2013.01); *B32B 2307/7376* (2023.05); *B32B 2307/748* (2013.01); *B32B 2367/00* (2013.01); *B32B 2405/00* (2013.01)

(58) Field of Classification Search
 CPC .......... B32B 2037/243; B32B 2255/10; B32B 2255/26; B32B 2264/10; B32B 2264/302; B32B 2307/412; B32B 2307/7376; B32B 2307/748; B32B 2367/00; B32B 2405/00; B32B 2264/102; B32B 2264/104; B32B 27/20; C09J 7/255; C09J 7/38; C09J 7/401; C09J 7/403; C09J 7/405; C09J 2203/326; C09J 2301/122; C09J 2301/302; C09J 2467/006; C09J 2483/005; H05K 1/02; Y10T 428/14
 See application file for complete search history.

(56) References Cited

U.S. PATENT DOCUMENTS

| | | | |
|---|---|---|---|
| 2010/0196664 A1* | 8/2010 | Kuiper | ........................ C09J 7/40 428/156 |
| 2010/0317802 A1 | 12/2010 | Aoyama et al. | |

FOREIGN PATENT DOCUMENTS

| | | | | |
|---|---|---|---|---|
| JP | 2002544364 A | 12/2002 | | |
| JP | 200364318 A | 3/2003 | | |
| JP | 2004351626 A | 12/2004 | | |
| JP | 200628416 A | 2/2006 | | |
| JP | 2009277860 A | 11/2009 | | |
| JP | 2014532602 A | 12/2014 | | |
| JP | 201534258 A | 2/2015 | | |
| JP | 2017531050 A | 10/2017 | | |
| JP | 20204896 A | 1/2020 | | |
| JP | 2022550806 A | * 12/2022 | ............. | C09J 7/201 |
| KR | 1020170029976 A | 3/2017 | | |
| TW | 202242215 A | 11/2022 | | |
| WO | WO2011155582 A1 | 12/2011 | | |
| WO | WO 2014080918 A1 | 5/2014 | | |
| WO | WO 2019039264 A1 | 2/2019 | | |

* cited by examiner

TRANSPARENT SOLDER MASK PROTECTION FILM, METHOD FOR PRODUCING THE SAME, AND METHOD FOR USING THE SAME

CROSS-REFERENCE TO RELATED PATENT APPLICATION

This application claims the benefit of priority to Taiwan Patent Application No. 112125433, filed on Jul. 7, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a protection film, and more particularly to a transparent solder mask protection film, a method for producing the same, and a method for using the same.

BACKGROUND OF THE DISCLOSURE

In the conventional technology, a circuit layout on an integrated circuit (IC) substrate often has an extremely thin line width, an extremely narrow line pitch, and a high line resolution. As such, when the integrated circuit (IC) substrate is used in a high-frequency product, the high-frequency product has an extremely high requirement for reliability, and the quality of a packaging process determines a value of the high-frequency product.

A solder mask formed on the integrated circuit (IC) substrate is in contact with an encapsulation adhesive, and adhesion between the solder mask and the encapsulation adhesive may affect the reliability and the quality of the integrated circuit (IC) substrate.

By adjusting an appearance of a surface of the solder mask, the adhesion between the solder mask and the encapsulation adhesive can be improved, so as to ensure the performance of the integrated circuit (IC) substrate. However, the appearance of the surface of the solder mask is mainly determined by a transparent solder mask protection film attached to the surface of the solder mask during an exposure process. A conventional transparent solder mask protection film cannot accurately control the appearance of the surface of the solder mask, thereby resulting in poor reliability and poor quality (e.g., poor adhesion or occurrence of board explosion) of the integrated circuit (IC) substrate.

SUMMARY OF THE DISCLOSURE

In response to the above-referenced technical inadequacies, the present disclosure provides a transparent solder mask protection film, a method for producing the same, and a method for using the same.

In order to solve the above-mentioned problems, one of the technical aspects adopted by the present disclosure is to provide a transparent solder mask protection film that includes a first film layer, a second film layer, and a release film material. The first film layer is a polyester base film layer. The second film layer is formed on a surface of the first film layer, and the second film layer is a pressure sensitive adhesive film layer. The release film material is formed on a surface of the second film layer away from the first film layer. The release film material includes a release base film and a release coating layer. The release coating layer is disposed between the release base film and the second film layer, and the release coating layer is directly attached to the surface of the second film layer away from the first film layer. The release base film is a polyester release film, and the release coating layer includes a silicone resin material and a plurality of inorganic particles dispersed in the silicone resin material. The plurality of inorganic particles enable a surface of the release coating layer away from the release base film to present an uneven appearance, which is imprinted onto the surface of the second film layer that is directly attached to the release coating layer. After the release film material is separated from the second film layer through the release coating layer of the release film material, the surface of the second film layer away from the first film layer is formed into a concave-convex microstructure.

In one of the possible or preferred embodiments, the first film layer has a first thickness of between 5 micrometers and 20 micrometers, the second film layer has a second thickness of between 3 micrometers and 18 micrometers, the release base film has a third thickness of between 15 micrometers and 35 micrometers, and the release coating layer has a fourth thickness of between 0.1 micrometers and 1 micrometer.

In one of the possible or preferred embodiments, the plurality of inorganic particles have an average particle size of between 0.001 micrometers and 1 micrometer.

In one of the possible or preferred embodiments, a size ratio between the fourth thickness of the release coating layer and the average particle size of the inorganic particles is between 5:1 and 20:1.

In one of the possible or preferred embodiments, the plurality of inorganic particles are at least partially exposed on the surface of the release coating layer away from the release base film to enable the surface of the release coating layer away from the release base film to present the uneven appearance.

In one of the possible or preferred embodiments, the silicone resin material is at least one material selected from the group consisting of a methyl silicone resin, a methyl phenyl silicone resin, a vinyl silicone resin, a methyl vinyl silicone resin, an amino silicone resin, an epoxy modified silicone resin, and a derivative thereof. In addition, each of the inorganic particles is at least one material selected from the group consisting of silicon dioxide, calcium carbonate, calcium phosphate, barium sulfate, kaolin clay, talc, glass powder, and a derivative thereof.

In one of the possible or preferred embodiments, the release coating layer is formed by coating a release coating material on the release base film and drying a solvent present in the release coating material. The release coating material includes the silicone resin material, the inorganic particles, an additive, and the solvent. The silicone resin material, the inorganic particles, and the additive are solid components in the release coating material. In the release coating layer, a total weight of the silicone resin material and the inorganic particles accounts for at least 80% by weight in the solid components. A weight ratio between the silicone resin material and the inorganic particles is between 0.3:1 and 1.1:1.

In one of the possible or preferred embodiments, a glass transition temperature of the second film layer is between −50° C. and 50° C.

In order to solve the above-mentioned problems, another one of the technical aspects adopted by the present disclosure is to provide a method for producing a transparent solder mask protection film. The method includes: providing a first film layer and a second film layer that is formed on a surface of the first film layer, in which the first film layer is a polyester base film layer, and the second film layer is a pressure sensitive adhesive film layer; providing a release film material that includes a release base film and a release coating layer formed on a surface of the release base film, in which the release coating layer faces towards the second film layer, the release base film is a polyester release film, the release coating layer includes a silicone resin material and a plurality of inorganic particles dispersed in the silicone resin material, and the plurality of inorganic particles enable a surface of the release coating layer away from the release base film to present an uneven appearance; and attaching the release coating layer of the release film material to a surface of the second film layer away from the first film layer so as to form the transparent solder mask protection film. After the release film material is separated from the second film layer through the release coating layer of the release film material, the surface of the second film layer away from the first film layer is formed into a concave-convex microstructure.

In order to solve the above-mentioned problems, yet another one of the technical aspects adopted by the present disclosure is to provide a method for using a transparent solder mask protection film. The method includes: providing the above-mentioned transparent solder mask protection film; separating the release film material from the second film layer through the release coating layer of the release film material so as to enable the surface of the second film layer away from the first film layer to be formed into the concave-convex microstructure; providing a circuit board that includes a wiring plate and a solder mask formed on the wiring plate; attaching the concave-convex microstructure of the surface of the second film layer to the solder mask of the circuit board to imprint a pattern of the concave-convex microstructure onto a surface of the solder mask away from the wiring plate; and removing the first film layer and the second film layer from the solder mask of the circuit board, so that the surface of the solder mask away from the wiring plate is formed into a rough surface that is imprinted from the pattern of the concave-convex microstructure. A material hardness of the second film layer is greater than a material hardness of the solder mask, and the rough surface has an arithmetic average roughness (Ra) of between 0.01 nanometers and 0.5 nanometers.

Therefore, through material designs of the release coating layer and the pressure sensitive adhesive film layer, the transparent solder mask protection film provided by the present disclosure can effectively regulate an appearance of a surface of a solder mask on an integrated circuit (IC) substrate, so as to effectively improve the reliability and the quality of the integrated circuit (IC) substrate, and enhance adhesion between the solder mask and an encapsulation adhesive. Moreover, a problem of board explosion can be effectively prevented.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
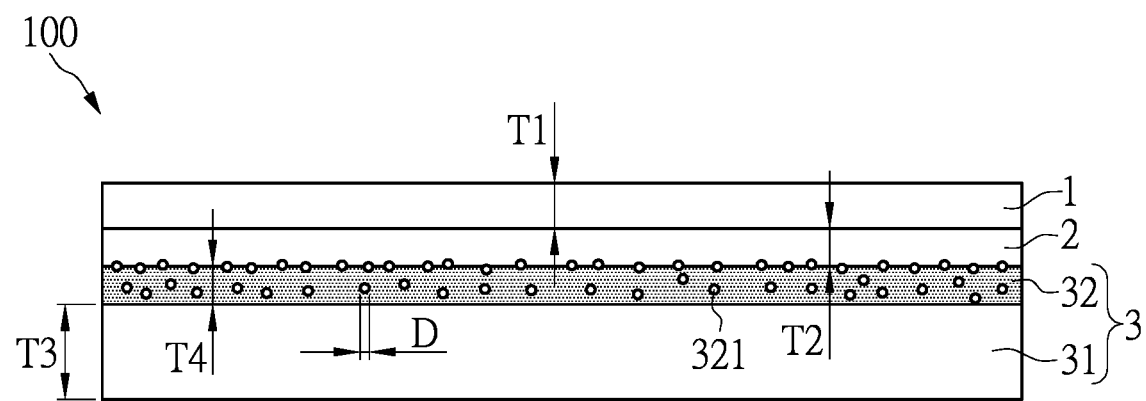
FIG. 1 is a schematic view of a stacked structure of a transparent solder mask protection film according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

[Transparent Solder Mask Protection Film]

Reference is made to FIG. 1. An embodiment of the present disclosure provides a transparent solder mask protection film 100. The transparent solder mask protection film 100 can be, for example, used for covering an integrated circuit (IC) substrate during a packaging process of the integrated circuit (IC) substrate.

For example, after a solder mask (or a solder resist) is coated onto a wiring plate of the integrated circuit (IC) substrate, the transparent solder mask protection film can be further attached to the solder mask. The transparent solder mask protection film attached to the solder mask can directly undergo an exposure operation without being torn off. The transparent solder mask protection film can be removed before the solder mask is developed, thereby effectively shortening a process time and realizing anti-oxidation of the solder mask. However, a method for using the transparent solder mask protection film 100 of the present disclosure is not limited thereto.

It is worth mentioning that the transparent solder mask protection film 100 provided by the embodiment of the present disclosure can effectively regulate an appearance of a surface of the solder mask, and thus can effectively improve the reliability and the quality of the integrated circuit (IC) substrate.

The transparent solder mask protection film 100 includes a first film layer 1, a second film layer 2, and a release film material 3 that are stacked sequentially from top to bottom.

The first film layer 1 is a polyester base film layer, and the polyester base film layer is preferably formed of polyethylene terephthalate (PET).

The first film layer 1 has a first thickness T1 of between 5 micrometers and 20 micrometers, and preferably between 10 micrometers and 15 micrometers. For example, the first thickness T1 of the first film layer 1 can be 10 micrometers, 12 micrometers, or 14 micrometers, but the present disclosure is not limited thereto.

The second film layer 2 is formed on a surface of the first film layer 1. The second film layer 2 is a pressure sensitive adhesive film layer (also referred to as an optical adhesive film layer). The second film layer 2 is preferably a pressure sensitive adhesive film layer formed of an OCA pressure-sensitive adhesive (or an optical clear adhesive). In an embodiment of the present disclosure, the OCA pressure-sensitive adhesive can be, for example, an acrylic pressure-sensitive adhesive.

The second film layer 2 has a second thickness T2 of between 3 micrometers and 18 micrometers, and preferably between 8 micrometers and 13 micrometers. For example, the second thickness T2 can be 8 micrometers or 10 micrometers, but the present disclosure is not limited thereto.

The release film material 3 is formed on a surface of the second film layer 2 away from the first film layer 1. The release film material 3 further includes a release base film 31 and a release coating layer 32 formed on a surface of the release base film 31. The release coating layer 32 is disposed between the release base film 31 and the second film layer 2, and the release coating layer 32 is directly attached to the surface of the second film layer 2 away from the first film layer 1.

The release base film 31 is a polyester release film, which is preferably formed of polyethylene terephthalate (PET).

The release base film 31 has a third thickness T3 of between 15 micrometers and 35 micrometers, and preferably between 20 micrometers and 30 micrometers. For example, the third thickness T3 of the release base film 31 can be 21 micrometers, 25 micrometers, or 29 micrometers, but the present disclosure is not limited thereto.

Furthermore, the release coating layer 32 is preferably formed on the surface of the release base film 31 by a wet coating process.

The release coating layer 32 is a silicone resin coating layer, and includes a plurality of inorganic particles 321 dispersed therein. Specifically, the release coating layer 32 includes a silicone resin material and the inorganic particles 321 dispersed in the silicone resin material.

The plurality of inorganic particles 321 enable a surface of the release coating layer 32 away from the release base film 31 to present an uneven appearance, which is imprinted onto the surface of the second film layer 2 that is directly attached to the release coating layer 32.

Figure 3A:
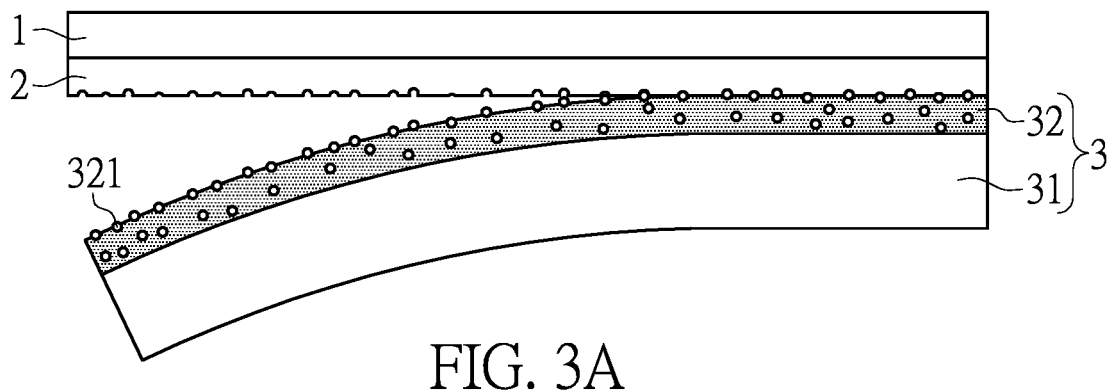
FIG. 3A is a schematic view of step S210 of a method for using the transparent solder mask protection film according to the embodiment of the present disclosure.
Figure 3B:
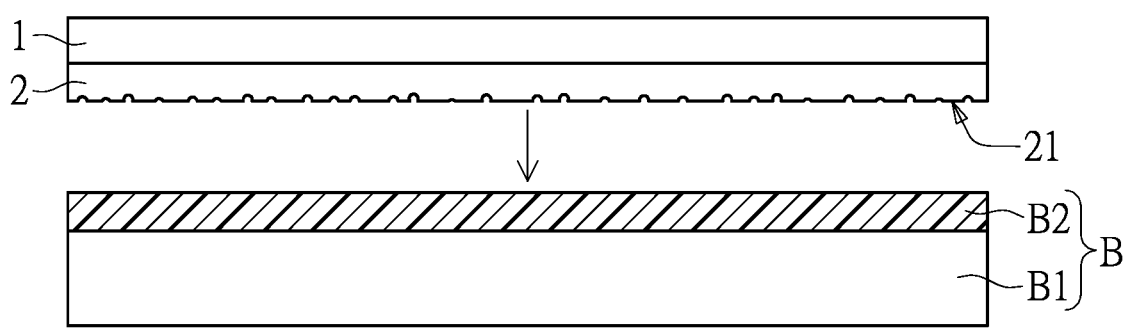
FIG. 3B is a schematic view of step S220 of the method for using the transparent solder mask protection film according to the embodiment of the present disclosure.

After the release film material 3 is separated from the second film layer 2 through the release coating layer 32 of the release film material 3 (as shown in FIG. 3A), the surface of the second film layer 2 away from the first film layer 1 is formed into a concave-convex microstructure 21 (as shown in FIG. 3B).

In an embodiment of the present disclosure, the plurality of inorganic particles 321 are at least partially exposed on the surface of the release coating layer 32 away from the release base film 31, so that the surface of the release coating layer 32 away from release base film 31 presents the uneven appearance.

The release coating layer 32 has a fourth thickness T4 of between 0.1 micrometers and 1.0 micrometer, and preferably between 0.3 micrometers and 0.8 micrometers. For example, the fourth thickness T4 of the release coating layer 32 can be 0.3 micrometers or 0.5 micrometers, but the present disclosure is not limited thereto.

Furthermore, the plurality of inorganic particles 321 have an average particle size D of between 0.001 micrometers and 1.0 micrometer, preferably between 0.03 micrometers and 0.1 micrometers, and more preferably between 0.03 micrometers and 0.07 micrometers. For example, the average particle size D of the inorganic particles 321 can be 0.03 micrometers, 0.04 micrometers, or 0.05 micrometers, but the present disclosure is not limited thereto.

It should be noted that the average particle size D of the inorganic particles 321 of the embodiment of the present disclosure is defined by a "D50 value", which refers to a particle size obtained when a cumulative fineness distribution percentage of a plurality of inorganic particles reaches 50%.

The physical meaning of the D50 value is that particles having a particle size larger than this average particle size value account for 50%, and particles smaller than this average particle size value also account for 50%.

It is worth mentioning that, in some embodiments of the present disclosure, a size ratio between the fourth thickness T4 of the release coating layer 32 and the average particle size D of the inorganic particles 321 is preferably between 5:1 and 20:1, and more preferably between 8:1 and 18:1. For example, the size ratio can be 10:1, 12.5:1, or 16.6:1, but the present disclosure is not limited thereto.

In terms of material types, the silicone resin material can be a poly-siloxane resin. More specifically, the silicone resin material is at least one material selected from the group consisting of a methyl silicone resin, a methyl phenyl silicone resin, a vinyl silicone resin, a methyl vinyl silicone resin, an amino silicone resin, an epoxy modified silicone resin, and a derivative thereof.

In an embodiment of the present disclosure, the silicone resin material can be, for example, polydimethylsiloxane (PDMS), but the present disclosure is not limited thereto.

Furthermore, the inorganic particles can be, for example, at least one material selected from the group consisting of: silicon dioxide ($SiO_2$), calcium carbonate ($CaCO_3$), calcium phosphate ($Ca_3(PO_4)_2$), barium sulfate ($BaSO_4$), kaolin clay ($Al_2Si_2O_5(OH)_4$), talc ($Mg_3Si_4O_{10}(OH)_2$), glass powders, and derivatives thereof. In an embodiment of the present disclosure, the inorganic particles can be, for example, silicon dioxide particles, but the present disclosure is not limited thereto.

A material hardness of the inorganic particles 321 is greater than a material hardness of the silicone resin material, and is also greater than a material hardness of the second film layer 2 (i.e., the pressure sensitive adhesive film layer).

Accordingly, the uneven appearance formed by the inorganic particles 321 on the surface of the release coating layer 32 can be imprinted onto the surface of the second film layer 2 (i.e., the pressure-sensitive adhesive film layer) away from the first film layer 1 (i.e., the polyester base film layer).

As described above, the release coating layer 32 is preferably formed on the surface of the release base film 31 by the wet coating process. In the present embodiment, the release coating layer 32 is formed by coating a release coating material on the release base film 31 and drying a solvent present in the release coating material. That is, the release coating material is in a fluid state, and the release coating layer 32 is formed after the solvent present in the release coating material is dried.

More specifically, the release coating material includes: the silicone resin material, the inorganic particles, an additive, and the solvent.

In terms of a content range, based on a total weight of the release coating material being 100 parts by weight, an amount of the silicone resin material is between 1 part by weight and 15 parts by weight, preferably between 3 parts by weight and 8 parts by weight, and more preferably between 4.5 parts by weight and 6.5 parts by weight. An amount of the inorganic particles is between 1 part by weight and 15 parts by weight, preferably between 5 parts by weight and 11 parts by weight, and more preferably between 7 parts by weight and 9 parts by weight.

An amount of the additive is between 0.5 parts by weight and 5 parts by weight, preferably between 1 part by weight and 5 parts by weight, and more preferably between 1 part by weight and 3 parts by weight. Furthermore, an amount of the solvent is between 65 parts by weight and 97.5 parts by weight, preferably between 75 parts by weight and 95 parts by weight, and more preferably between 80 parts by weight and 90 parts by weight.

The silicone resin material, the inorganic particles, and the additive are solid components of the release coating material. The solvent is a liquid component of the release coating material. After the release coating material is dried, the solvent is mostly removed from the release coating material, and the solid components are retained in the release coating material to form the release coating layer 32.

From another perspective, in the release coating layer 32, a total weight of the silicone resin material and the inorganic particles accounts for at least 80% (preferably at least 88%) of a weight of the solid components.

In addition, a weight ratio between the silicone resin material and the inorganic particles can be, for example, between 0.3:1 and 1.1:1, preferably between 0.4:1 and 1.0:1, and more preferably between 0.5:1 and 0.95:1.

The material types of the silicone resin material and the inorganic particles have been described above, and will not be reiterated herein. The additive can be, for example, a metal catalyst (such as a bismuth catalyst, a platinum catalyst, or a tin catalyst). Alternatively, the additive can be modified siloxane. The solvent can be, for example, selected from the group consisting of toluene, xylene, acetone, methyl ethyl ketone, and isopropanol.

It is worth mentioning that the second film layer 2 (i.e., the pressure-sensitive adhesive film layer) is formed of an acrylic resin. The second film layer 2 is fully attached to the release coating layer 32. The hardness of the second film layer 2 directly affects an imprinted appearance of the of the second film layer 2.

In some embodiments of the present disclosure, a glass transition temperature (Tg) of the second film layer 2 (i.e., the pressure-sensitive adhesive film layer) is between $-50°$ C. and $50°$ C., preferably between $-5°$ C. and $20°$ C., and more preferably between $0°$ C. and $10°$ C. In this way, the second film layer 2 can have appropriate hardness to achieve a desired imprinted effect.

It is also worth mentioning that, in the transparent solder mask protection film 100 of the embodiment of the present disclosure, the most important parameters affecting the appearance of the solder mask on the integrated circuit (IC) substrate are the material characteristics of the silicone resin release coating layer and the pressure-sensitive adhesive film layer.

The average particle size and the amount of the inorganic particles, the size ratio between the coating thickness and the average particle size, and the hardness of the pressure-sensitive adhesive film layer are the main parameters affecting the appearance of the above-mentioned solder mask.

The transparent solder mask protection film 100 of the embodiment of the present disclosure can regulate the appearance of the surface of the solder mask on the integrated circuit (IC) substrate, so that adhesion between the solder mask and an encapsulation adhesive can be improved to ensure the performance of the integrated circuit (IC) substrate. In addition, the appearance of the solder mask is mainly determined by the transparent solder mask protection film 100.

In the present embodiment, the appearance of the silicone resin release coating layer is controlled by the wet coating process, and the silicone resin release coating layer is further bonded to the pressure-sensitive adhesive film layer.

Therefore, the pattern imprinted from the pressure-sensitive adhesive film layer can also obtain consistency.

According to the above configuration, the transparent solder mask protection film 100 provided by the present disclosure can effectively regulate the appearance of the surface of the solder mask on the integrated circuit (IC) substrate, so as to effectively improve the reliability and the quality of the integrated circuit (IC) substrate, and enhance the adhesion between the solder mask and the encapsulation adhesive. Moreover, a problem of board explosion can be effectively prevented.

[Method for Producing Transparent Solder Mask Protection Film]

The structural and material characteristics of the transparent solder mask protection film of the embodiment of the present disclosure are described above, and a method for producing a transparent solder mask protection film of an embodiment of the present disclosure will be described below.

Figure 2A:
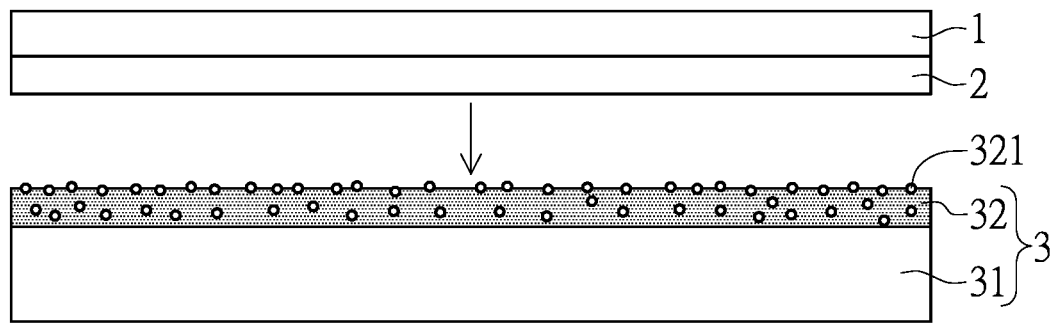
FIG. 2A is a schematic view of step S110 of a method for producing the transparent solder mask protection film according to the embodiment of the present disclosure.
Figure 2B:
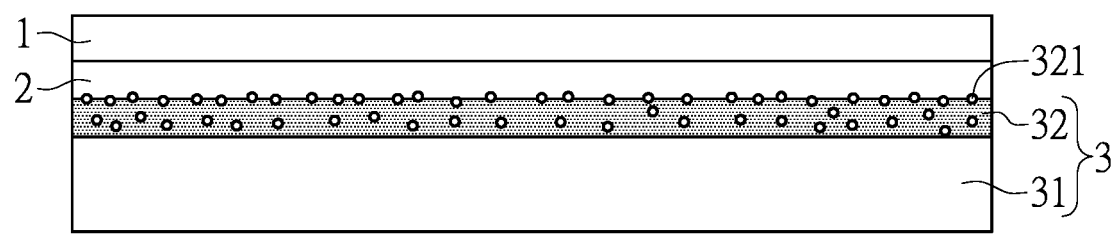
FIG. 2B is a schematic view of step S120 of the method for producing the transparent solder mask protection film according to the embodiment of the present disclosure.

Reference is made to FIG. 2A and FIG. 2B. An embodiment of the present disclosure also provides a method for producing a transparent solder mask protection film, which includes step S110 and step S120. It should be noted that sequences of steps and actual manners of operation in the present disclosure can be adjusted according to practical requirements and are not limited to those in this embodiment. Furthermore, the transparent solder mask protection film of the embodiment of the present disclosure can be produced by the above-mentioned method, but the present disclosure is not limited thereto.

As shown in FIG. 2A, step S110 includes: providing a first film layer 1 and a second film layer 2 formed on a surface (i.e., a lower surface) of the first film layer 1, in which the first film layer 1 is a polyester base film layer, and the second film layer 2 is a pressure sensitive adhesive film layer.

Step S110 further includes: providing a release film material 3 that includes a release base film 31 and a release coating layer 32 formed on a surface (i.e., an upper surface) of the release base film 31. The release coating layer 32 faces towards the second film layer 2 (i.e., the pressure sensitive adhesive film layer).

The release base film 31 is a polyester release film. The release coating layer 32 is formed on the surface of the release base film 31 by a wet coating process. The release coating layer 32 is a silicone resin coating layer. Specifically, the release coating layer 32 includes a silicone resin material and a plurality of inorganic particles 321 dispersed in the silicone resin material. The inorganic particles 321 enable a surface of the release coating layer 32 away from the release base film 31 to present an uneven appearance.

As shown in FIG. 2B, step S120 includes: attaching the release coating layer 32 (i.e., the silicone resin coating layer) of the release film material 3 to a surface of the second film layer 2 (i.e., the pressure sensitive adhesive film layer) away from the first film layer 1 (i.e., the polyester base film layer), so as to complete preparation of the transparent solder mask protection film.

Accordingly, the uneven appearance of the surface of the release coating layer 32 can be imprinted onto the surface of the second film layer 2 attached to the release coating layer 32.

After the release film material 3 is separated from the second film layer 2 (as shown in FIG. 3A) through the release coating layer 32, the surface of the second film layer 2 away from the first film layer 1 is formed into a concave-convex microstructure 21 that is imprinted from the uneven appearance of the release coating layer 32 (as shown in FIG. 3B).

[Method for Using Transparent Solder Mask Protection Film]

Reference is made to FIG. 3A to FIG. 3D. An embodiment of the present disclosure also provides a method for using a transparent solder mask protection film, which includes step S210, step S220, step S230, and step S240.

It should be noted that sequences of steps and actual manners of operation in the present disclosure can be adjusted according to practical requirements and are not limited to those in this embodiment. Furthermore, the transparent solder mask protection film of the embodiment of the present disclosure can be used by the above-mentioned method, but the present disclosure is not limited thereto.

As shown in FIG. 3A, step S210 includes: providing the above-mentioned transparent solder mask protection film 100, which includes the first film layer 1 (i.e., the polyester base film layer), the second film layer 2 (i.e., the pressure-sensitive adhesive film layer), and the release film material 3 (which includes the release base film 31 and the release coating layer 32) stacked sequentially from top to bottom.

Step S210 further includes: separating the release film material 3 from the second film layer 2 through the release coating layer 32, so as to enable the surface of the second film layer 2 away from the first film layer 1 to form the concave-convex microstructure 21 that is imprinted from the uneven appearance of the release coating layer 32.

As shown in FIG. 3B, step S220 includes: providing a circuit board B, which includes a wiring plate B1 and a solder mask B2 formed on a surface (i.e., an upper surface) of the wiring plate B1; and orienting the concave-convex microstructure 21 on the surface of the second film layer 2 towards the solder mask B2.

The wiring plate B1 can be, for example, a copper wiring plate, and the solder mask B2 can be, for example, formed on the surface of the wiring plate B1 in a coating manner.

Figure 3C:
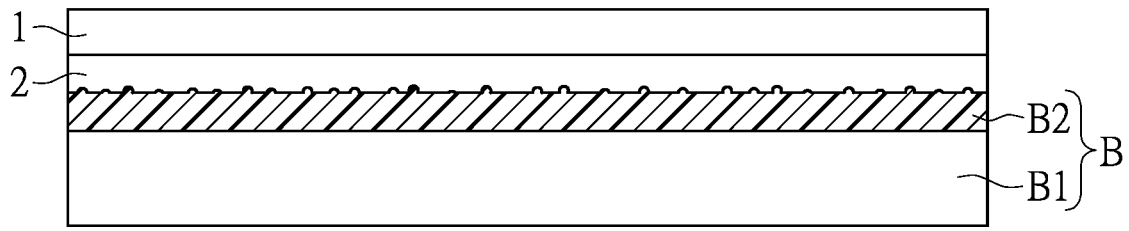
FIG. 3C is a schematic view of step S230 of the method for using the transparent solder mask protection film according to the embodiment of the present disclosure.

As shown in FIG. 3C, step S230 includes: closely attaching (or adhering) the concave-convex microstructure 21 of the surface of the second film layer 2 to the solder mask B2, so as to imprint a pattern of the concave-convex microstructure 21 onto a surface of the solder mask B2 away from the wiring plate B1. A material hardness of the second film layer 2 is greater than that of the solder mask B2. Step S230 further includes: performing the exposure operation on the solder mask B2 without removing the first film layer 1 (i.e., the polyester base film layer) and the second film layer 2 (i.e., the pressure-sensitive adhesive film layer).

Figure 3D:
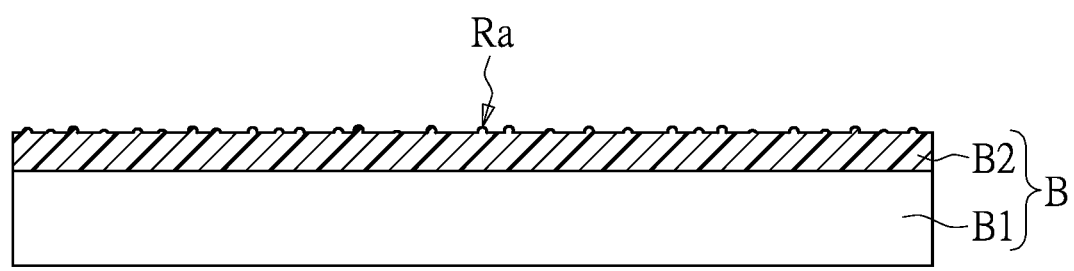
FIG. 3D is a schematic view of step S240 of the method for using the transparent solder mask protection film according to the embodiment of the present disclosure.

As shown in FIG. 3D, step S240 includes: removing, after the exposure operation is completed, the first film layer 1 and the second film layer 2 from the solder mask B2 of the circuit board B, so that the surface of the solder mask B2 away from the wiring plate B1 is formed into a rough surface Ra that is imprinted from the pattern of the concave-convex microstructure 21. The rough surface Ra has an arithmetic average roughness (Ra) of between 0.01 nanometers and 0.5 nanometers, and preferably between 0.05 nanometers and 0.1 nanometers.

[Experimental Data and Test Results]

Hereinafter, a detailed description will be provided with reference to Exemplary Examples 1 to 3 and Comparative Examples 1 and 2. However, the following examples are only provided to help understanding of the present disclosure, and are not to be construed as limiting the scope of the present disclosure. Here, Exemplary Examples 1 to 3 are examples that can prove the technical effects of the present disclosure, and Comparative Examples 1 and 2 are examples with poor technical effects.

In Exemplary Example 1, a transparent solder mask protection film is prepared according to conditions shown in Table 1 below. The transparent solder mask protection film includes a first film layer (i.e., a PET base film layer), a second film layer (i.e., an OCA film layer), and a release film material (i.e., a composite film material that includes a silicon resin release coating layer and a PET release base film) that are sequentially stacked. A thickness condition of each layer is listed in Table 1. A glass transition temperature (Tg) of the second film layer (i.e., the OCA film layer) is 0° C. The silicon resin release coating layer is formed by applying a release coating material to the PET release base film through a wet coating process.

A formula of the release coating material is shown in Table 1, which includes: 6.5 parts by weight of a silicone resin (i.e., polydimethylsiloxane), 7 parts by weight of inorganic particles (i.e., silicon dioxide particles), 1.5 parts by weight of an additive (i.e., fluorine modified siloxane), and 85 parts by weight of a solvent (i.e., a co-solvent that includes toluene and methyl ethyl ketone with a volume ratio of 1:1). An average particle size of the inorganic particles is 0.03 micrometers. A weight ratio between the silicone resin and the inorganic particles is 6.5:7.0 (i.e., 6.5/7.0=0.93). A size ratio between a coating thickness of the silicon resin release coating layer and the average particle size of the inorganic particles is 0.5:0.03 (i.e., 0.5/0.03=16.6).

Then, the solvent in the release coating material is removed for formation of the silicone resin release coating layer. The silicone resin release coating layer is directly attached to the second film layer (i.e., the OCA film layer). The release film material of the transparent solder mask protection film is further separated from the second film layer by the silicone resin release coating layer, so that a surface of the second film layer (i.e., the OCA film layer) is formed into a concave-convex microstructure. According to the method in the above-mentioned embodiment, a rough surface that is imprinted from a pattern of the concave-convex microstructure is formed on a surface of a solder mask of a circuit board. Finally, physical properties of the solder mask are tested, such as a surface gloss value (GU) of the solder mask, a surface roughness (nanometer) of the solder mask, and whether or not the solder mask has a grainy surface.

The preparation methods of Exemplary Examples 2 and 3 and Comparative Examples 1 and 2 are the same as Exemplary Example 1, except for the OCA glass transition temperature, the thickness of the silicone resin release coating layer, and/or the formula of the silicone resin release coating material. Detailed differences of the parameters are shown in Table 1, and will not be reiterated herein.

TABLE 1

| | Items | Exemplary Example 1 | Exemplary Example 2 | Exemplary Example 3 |
|---|---|---|---|---|
| Transparent solder mask protection film | Thickness (μm) of first film layer (PET base film layer) | 12 | 12 | 12 |
| | Thickness (μm) of second film layer (OCA film layer) | 10 | 10 | 10 |
| | Glass transition temperature Tg (° C.) of second film layer (OCA film layer) | 0 | 5 | 10 |
| | Thickness (μm) of silicon resin release coating layer of release film material | 0.5 | 0.5 | 0.5 |
| | Thickness (μm) of PET release base film of release film material | 25 | 25 | 25 |
| Formula of coating material | Amount of silicone resin (parts by weight) | 6.5 | 5.5 | 4.5 |
| | Amount of inorganic particles (parts by weight) | 7.0 | 8.0 | 9.0 |
| | Average particle size (μm) of inorganic particles | 0.03 | 0.04 | 0.05 |
| | Amount of additive (parts by weight) | 1.5 | 1.5 | 1.5 |
| | Amount of solvent (parts by weight) | 85 | 85 | 85 |
| Other parameters | Weight ratio between silicone resin and inorganic particles | 6.5/7.0 = 0.93 | 5.5/8.0 = 0.69 | 4.5/9.0 = 0.5 |
| | Size ratio between coating thickness and average particle size | 0.5/0.03 = 16.6 | 0.5/0.04 = 12.5 | 0.5/0.05 = 10 |
| Physical properties of solder mask | Surface gloss value (GU) of solder mask | 82 | 80 | 78 |
| | Surface roughness Ra (nanometer) of solder mask | 0.07 | 0.08 | 0.09 |

| | Items | Comparative Example1 | Comparative Example2 |
|---|---|---|---|
| Transparent solder mask protection film | Thickness (μm) of first film layer (PET base film layer) | 12 | 12 |
| | Thickness (μm) of second film layer (OCA film layer) | 10 | 10 |

-continued

| | Items | Comparative Example1 | Comparative Example2 |
|---|---|---|---|
| | Glass transition temperature Tg (° C.) of second film layer (OCA film layer) | 5 | 5 |
| | Thickness (μm) of silicon resin release coating layer of release film material | 0.1 | 0.5 |
| | Thickness (μm) of PET release base film of release film material | 25 | 25 |
| Formula of coating material | Amount of silicone resin (parts by weight) | 6.5 | 6.5 |
| | Amount of inorganic particles (parts by weight) | 7.0 | 7.0 |
| | Average particle size (μm) of inorganic particles | 0.03 | 0.12 |
| | Amount of additive (parts by weight) | 1.5 | 1.5 |
| | Amount of solvent (parts by weight) | 85 | 85 |
| Other parameters | Weight ratio between silicone resin and inorganic particles | 6.5/7.0 = 0.93 | 6.5/7.0 = 0.93 |
| | Size ratio between coating thickness and average particle size | 0.1/0.03 = 3.33 | 0.5/0.12 = 4.16 |
| Physical properties of solder mask | Surface gloss value (GU) of solder mask | 70 | 70 |
| | Surface roughness Ra (nanometer) of solder mask | 0.12 | 0.15 |

In the test method for the surface gloss value (GU) of the above-mentioned solder mask, a gloss meter (i.e., a micro-TRI-gloss meter purchased from BYK-Gardner) is used to measure a 60-degree gloss value of the solder mask according to ASTM D523, and three sets of readings under a measurement area of 75 mm×150 mm are recorded, so as to calculate an average value of the three sets of readings. The results are recorded in Table 1, and the unit is a gloss unit (GU).

In the test method for the surface roughness Ra (nanometer) of the solder mask, a surface roughness meter is used to obtain an arithmetic average roughness (Ra) of the solder mask according to JIS-B-0601 (2001).

The test results recorded in Table 1 show that the surface gloss value of the solder mask of each of Exemplary Examples 1 to 3 is at least greater than 75 GU, and is specifically between 78 GU and 82 GU. In addition, the surface roughness (Ra) of the solder mask of each of Exemplary Examples 1 to 3 falls within a range of from 0.05 nm to 0.1 nm, and specifically falls within a range of from 0.07 nm to 0.09 nm, which is a suitable range of surface roughness.

That is, the transparent solder mask protection film of each of Exemplary Examples 1 to 3 can effectively regulate the appearance of the surface of the solder mask, effectively improve the reliability and the quality of the circuit board, and effectively enhance the adhesion between the solder mask and the encapsulation adhesive in a subsequent packaging process, so as to prevent the problem of board explosion.

Comparative Example 1 adopts a thin silicone resin release coating layer (its thickness being only 0.1 micrometers), and the size ratio between the coating thickness of the silicon resin release coating layer and the average particle size of the inorganic particles is 3.33, which is smaller than an ideal ratio value range (i.e., from 5 to 20).

Comparative Example 2 adopts coarse inorganic particles having an average particle size of 0.12 micrometers, and the size ratio between the coating thickness of the silicon resin release coating layer and the average particle size of the inorganic particles is 4.16, which is smaller than the ideal ratio value range (i.e., from 5 to 20).

The surface gloss value of the solder mask of each of Comparative Examples 1 and 2 is less than 75 GU, and is specifically 70 GU. In addition, the surface roughness (Ra) of the solder mask of each of Comparative Examples 1 and 2 exceeds the range of from 0.05 nm to 0.1 nm, and specifically falls within a range of from 0.12 nm to 0.15 nm. The test results of the physical properties of the surface of the solder mask in each of Comparative Examples 1 and 2 are poor, such that application of Comparative Examples 1 and 2 in the subsequent packaging process may cause problems in terms of reliability and quality.

Beneficial Effects of the Embodiments

In conclusion, through material designs of the release coating layer and the pressure sensitive adhesive film layer, the transparent solder mask protection film provided by the present disclosure can effectively regulate the appearance of the surface of the solder mask on the integrated circuit (IC) substrate, so as to effectively improve the reliability and the quality of the integrated circuit (IC) substrate, and enhance the adhesion between the solder mask and the encapsulation adhesive. Moreover, the problem of board explosion can be effectively prevented.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A transparent solder mask protection film, comprising:
    a first film layer being a polyester base film layer;
    a second film layer formed on a surface of the first film layer, the second film layer being an acrylic pressure sensitive adhesive film layer that has a glass transition temperature of −5° C. to 20° C.; and
    a release film material formed on a surface of the second film layer away from the first film layer, wherein the release film material includes a release base film and a release coating layer, the release coating layer is disposed between the release base film and the second film layer, and the release coating layer is directly attached to the surface of the second film layer away from the first film layer;
    wherein the release base film is a polyethylene terephthalate polyester release film, and the release coating layer is a silicone resin coating layer that has a thickness of 0.3 µm to 0.8 µm and includes a silicone resin material and a plurality of inorganic particles dispersed in the silicone resin material;
    wherein the inorganic particles have an average particle size of 0.03 µm to 0.07 µm, the inorganic particles are at least partially exposed at a surface of the release coating layer away from the release base film, and partially embedded in the release coating layer;
    wherein a ratio of the thickness of the release coating layer to the average particle size of the inorganic particles is 8:1 to 18:1;
    wherein, in the release coating layer, the silicone resin material and the inorganic particles together account for at least 88 wt % of solid components, and a weight ratio between the silicone resin material and the inorganic particles is 0.5:1 to 0.95:1;
    wherein the inorganic particles enable a surface of the release coating layer away from the release base film to present an uneven appearance, which is imprinted onto the surface of the second film layer that is directly attached to the release coating layer;
    wherein, after the release film material is separated from the second film layer by the release coating layer of the release film material, the surface of the second film layer away from the first film layer is formed into a concave-convex microstructure, and the inorganic particles remain in the release coating layer.

2. The transparent solder mask protection film according to claim 1, wherein the first film layer has a first thickness of between 5 micrometers and 20 micrometers, the second film layer has a second thickness of between 3 micrometers and 18 micrometers, and the release base film has a third thickness of between 15 micrometers and 35 micrometers.

3. The transparent solder mask protection film according to claim 1, wherein the silicone resin material is selected from the group consisting of a methyl silicone resin, a methyl phenyl silicone resin, a vinyl silicone resin, a methyl vinyl silicone resin, an amino silicone resin, an epoxy modified silicone resin, and a derivative thereof; wherein each of the inorganic particles is selected from the group consisting of silicon dioxide, calcium carbonate, calcium phosphate, barium sulfate, kaolin clay, talc, glass powder, and a derivative thereof.

4. The transparent solder mask protection film according to claim 1, wherein the release coating layer is formed by coating a release coating material onto the release base film and drying a solvent present in the release coating material; wherein the release coating material includes the silicone resin material, the inorganic particles, an additive, and the solvent; wherein the silicone resin material, the inorganic particles, and the additive are solid components of the release coating material;
    providing a first film layer and a second film layer that is formed on a surface of the first film layer, wherein the first film layer is a polyester base film layer, and the second film layer is a pressure sensitive adhesive film layer;
    providing a release film material that includes a release base film and a release coating layer formed on a surface of the release base film, wherein the release coating layer faces towards the second film layer, the release base film is a polyester release film, and the release coating layer includes a silicone resin material and a plurality of inorganic particles dispersed in the silicone resin material; wherein the inorganic particles enable a surface of the release coating layer away from the release base film to present an uneven appearance; and
    attaching the release coating layer of the release film material to a surface of the second film layer away from the first film layer, so as to form the transparent solder mask protection film;
    wherein, after the release film material is separated from the second film layer by the release coating layer of the release film material, the surface of the second film layer away from the first film layer is formed into a concave-convex microstructure.

5. A method for using a transparent solder mask protection film, comprising:
    providing the transparent solder mask protection film as claimed in claim 1;
    separating the release film material from the second film layer by the release coating layer of the release film material, so that the surface of the second film layer away from the first film layer is formed into the concave-convex microstructure;
    providing a circuit board that includes a wiring plate and a solder mask that is formed on the wiring plate;
    attaching the concave-convex microstructure on the surface of the second film layer to the solder mask of the circuit board, so as to imprint a pattern of the concave-convex microstructure onto a surface of the solder mask away from the wiring plate; wherein a material hardness of the second film layer is greater than a material hardness of the solder mask; and
    removing the first film layer and the second film layer from the solder mask of the circuit board, so that the surface of the solder mask away from the wiring plate is formed into a rough surface that is imprinted from the pattern of the concave-convex microstructure; wherein the rough surface has an arithmetic average roughness (Ra) of between 0.01 nanometers and 0.5 nanometers.

* * * * *